(12) United States Patent
Shires (10) Patent No.: US 7,242,760 B2
(45) Date of Patent: Jul. 10, 2007

(54) AUTOMATIC DETECTING WHEN AN AGENT IS AVAILABLE

(75) Inventor: Glen E. Shires, Danville, CA (US)

(73) Assignee: Intel Corporation, Santa Clara, CA (US)

( * ) Notice: Subject to any disclaimer, the term of this patent is extended or adjusted under 35 U.S.C. 154(b) by 242 days.

(21) Appl. No.: 09/750,025

(22) Filed: Dec. 29, 2000

(65) Prior Publication Data

US 2002/0085704 A1 Jul. 4, 2002

(51) Int. Cl.
*H04M 3/00* (2006.01)
(52) U.S. Cl. .................... 379/265.01; 379/265.02; 379/265.04; 379/265.09
(58) Field of Classification Search ........... 379/265.02, 379/265.04, 265.09, 265.11, 265.01
See application file for complete search history.

(56) References Cited

U.S. PATENT DOCUMENTS

| | | | | |
|---|---|---|---|---|
| 5,428,608 A | * | 6/1995 | Freeman et al. | 370/261 |
| 5,721,770 A | * | 2/1998 | Kohler | 379/265.12 |
| 5,742,675 A | * | 4/1998 | Kilander et al. | 379/266.09 |
| 5,884,032 A | * | 3/1999 | Bateman et al. | 709/204 |
| 6,049,602 A | * | 4/2000 | Foladare et al. | 379/265.04 |
| 6,614,896 B1 | * | 9/2003 | Rao | 379/209.01 |
| 6,771,760 B1 | * | 8/2004 | Vortman et al. | 379/209.01 |

* cited by examiner

*Primary Examiner*—Quynh H. Nguyen
(74) *Attorney, Agent, or Firm*—Grossman, Tucker, Perreault, & Pfleger, PLLC (57) ABSTRACT

An arrangement is provided for enhancing the operational capabilities of a call center by automatically detecting when an agent is available. When an agent answers a routed call, corresponding to a call-back request, the agent enters an agent ID, representing the agent. The entered agent ID is encoded into DTMF tones. A telephony server detects the DTMF tones.

5 Claims, 8 Drawing Sheets

FIG. 8

AUTOMATIC DETECTING WHEN AN AGENT IS AVAILABLE

APPLICATION DATA

Three patent applications are being filed simultaneously that relate to various aspects of live customer support via a call center. The three patent applications are entitled "Data Integration With Interactive Voice Response Systems", "Automatic Detecting When An Agent Is Available", and "Matching Routed Call To Agent Workstation". The subject matter of each is hereby incorporated by reference into each of the others.

RESERVATION OF COPYRIGHT

This patent document contains information subject to copyright protection. The copyright owner has no objection to the facsimile reproduction by anyone of the patent document or the patent, as it appears in the U.S. Patent and Trademark Office files or records but otherwise reserves all copyright rights whatsoever.

BACKGROUND

1. Field of the Invention

Aspects of the present invention relate to telephone information services and customer support. Other aspects of the present invention relate to a providing live customer support and telephone information services via a call center.

2. General Background and Related Art

In today's highly competitive market, the quality of customer support often provides a competitive advantage to products and the companies that produce the products. Measures used to quantify the quality of customer support may include the responsiveness of customer support personnel and the skill of the representatives or agents who interact with the customer. Responsiveness may be measured by how long it takes for a customer to receive the customer support. Skill of customer support personnel may be measured by how effectively the problem of a customer, that requires customer support, is resolved.

To offer quality customer support, many companies provide call centers which customers may call with questions. These call centers are staffed by agents who help customers during phone conversations. Responsiveness is an indicator of how long a customer has to wait 'on hold' until getting to talk to an agent. Skill can be evaluated based on how many times a customer has to call to resolve the problem. The number of times needed may be attributed to the agent assigned to handle the customer's problems. That is, depending on the nature of the problem, agents with different skills are assigned to handle different categories of problems.

To improve the level of skill, a call center may be designed so as to utilize an effective interactive voice response system which prompts a customer, who calls for support, to answer various predetermined questions by making touch-tone responses on the phone. If these screening questions are carefully designed, they can identify the nature of the problem and help the customer get to agent with the appropriate skills and authority to effectively handle the customer's problem.

The responsiveness of a call center is related, at least in part, to the capacity of the call center and the volume of calls. When a call center has too few agents to provide customer support, a customer who calls for help may have to wait a long time until the call is answered by the next available agent. Of course, increasing the number of agents leads to increased cost, including salaries, training and other overhead.

An alternative approach to improving the responsiveness of a call center is to introduce an automated call-back mechanism. Instead of requiring a calling customer to wait in line for an agent to answer the call, an interactive voice response system may be designed to monitor the call center (e.g., the number of customers currently waiting in line and the approximate number of minutes until the calling customer may be answered) and to offer a calling customer the opportunity to choose a call-back option. If the calling customer chooses the call-back option (instead of waiting), the customer is prompted to provide additional information including call-back phone number where the customer can be reached. The entered call-back phone number may then be stored in a queue at the call center, together with other information characterizing the request for help. This other information may specify the nature of the problem and the customer account number. This information can be retrieved later and used by an agent, selected based on the specified problem, to return the customer's call.

Another recently emerged customer service feature, is to allow a customer to activate a phone call to a call center via an Internet web page. Live customer support offered by a call center may be accessed by clicking a button on a web page. When a customer clicks on the button, a phone call is initiated to the call center that supports the customer service. Currently implemented systems that facilitates such a feature do not forward relevant web-data, which may include information such as customer account number and the specification of the problem, to the call center.

Most of the call centers operating today do not have an automated call-back capability. Even though it would improve the quality of customer support by converting existing call centers that do not possess such capabilities to systems that support such capabilities, the conversion may require substantial investment and at the same time, cause disruption of the service provided by the original call center. Integrating existing call centers with web capabilities usually leads to the same consequences. It is beneficial to introduce new technologies that utilize existing call center systems and add new capabilities, such as web activation capability and automated call-back capability, to the existing call centers without introducing any disruption to the systems that are currently in operation.

BRIEF DESCRIPTION OF THE DRAWINGS

The present invention is further described in terms of exemplary embodiments which will be described in detail with reference to the drawings. These embodiments are non-limiting exemplary embodiments, in which like reference numerals represent similar parts throughout the several views of the drawings, and wherein.

DETAILED DESCRIPTION

Figure 1:
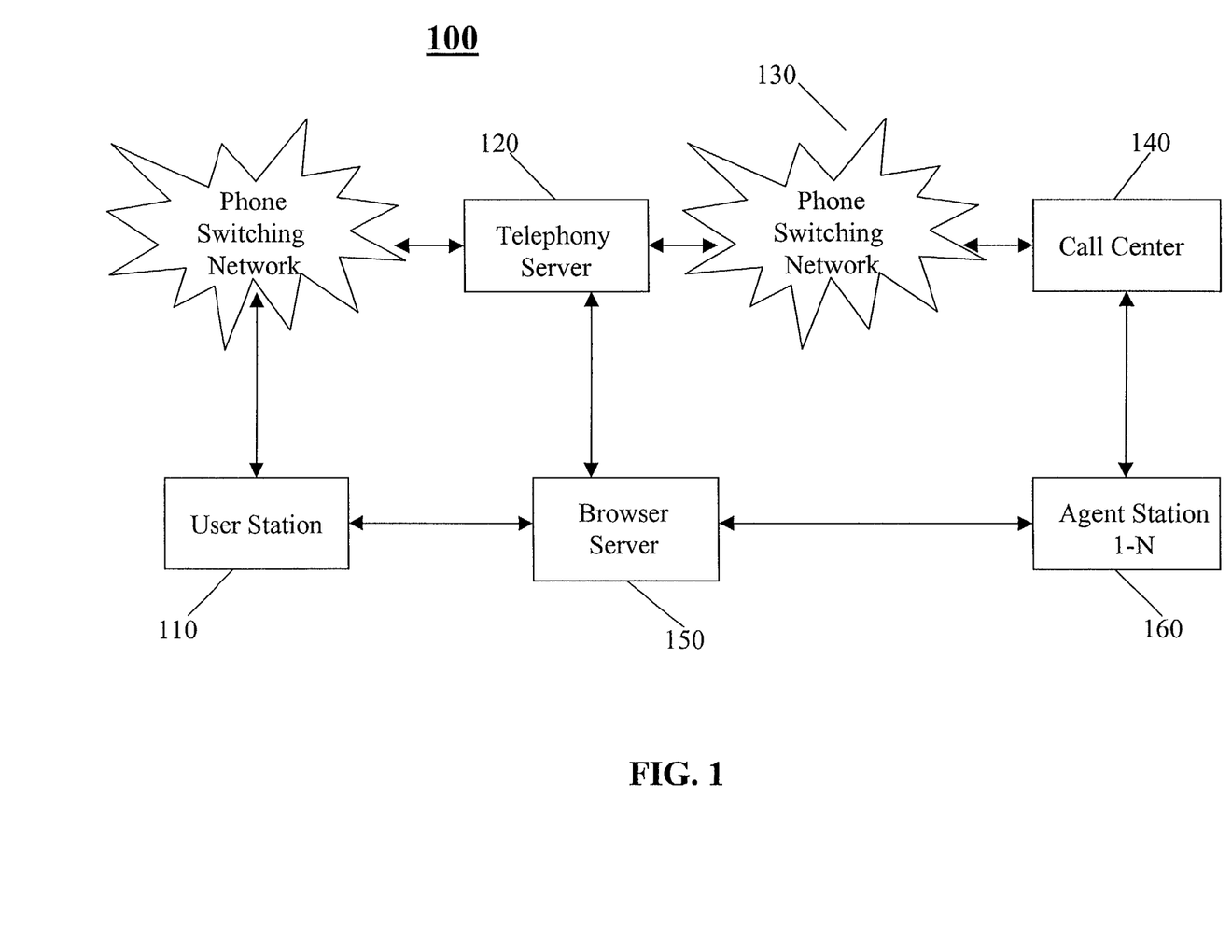
FIG. 1 is a high level block diagram of a live customer support system utilizing a telephony server.

FIG. 1 shows a high level block diagram of a system 100, in which a telephony server connects a customer, via a browser server, with a call center, to facilitate web activation and automated call-back capabilities. This arrangement is suitable for use with an existing call center that does not utilize web activation and/or automated call-back. System 100 includes a user station 110, a browser server 150, a telephony server 120, a phone switching network 130, and an agent station 1-N 160. The Telephony server 120 takes a customer request for live customer support (e.g., request for a call-back), initiated by a user at the user station 110 via a web page on the browser server 150 and, in response, places a conventional phone call to the call center 140, via the phone switching network 130. During the conversion, the Telephony server 120 encodes the web information that is necessary for the call center 140 to execute the requested call-back according to the criteria adopted by an interactive voice response system in the call center 140 so that the encoded results act the same way, in the call center 140, as a conventional customer phone call.

When the call center 140 receives the encoded information, it acts as a conventional call center, selecting an appropriate agent and routing the request to the selected agent. When the agent answers the routed call on a, for example, touch-tone phone, the Telephony server 120 detects the availability of the agent and then automatically places a call back from the agent to the customer who issues the web request for live customer support.

This arrangement addresses the problem of detecting when an agent is available at a call center so that a call-back, requested by a user via a web page, may be automatically made by connecting the agent who is determined to be available with the user who issued the call-back request.

Figure 2:
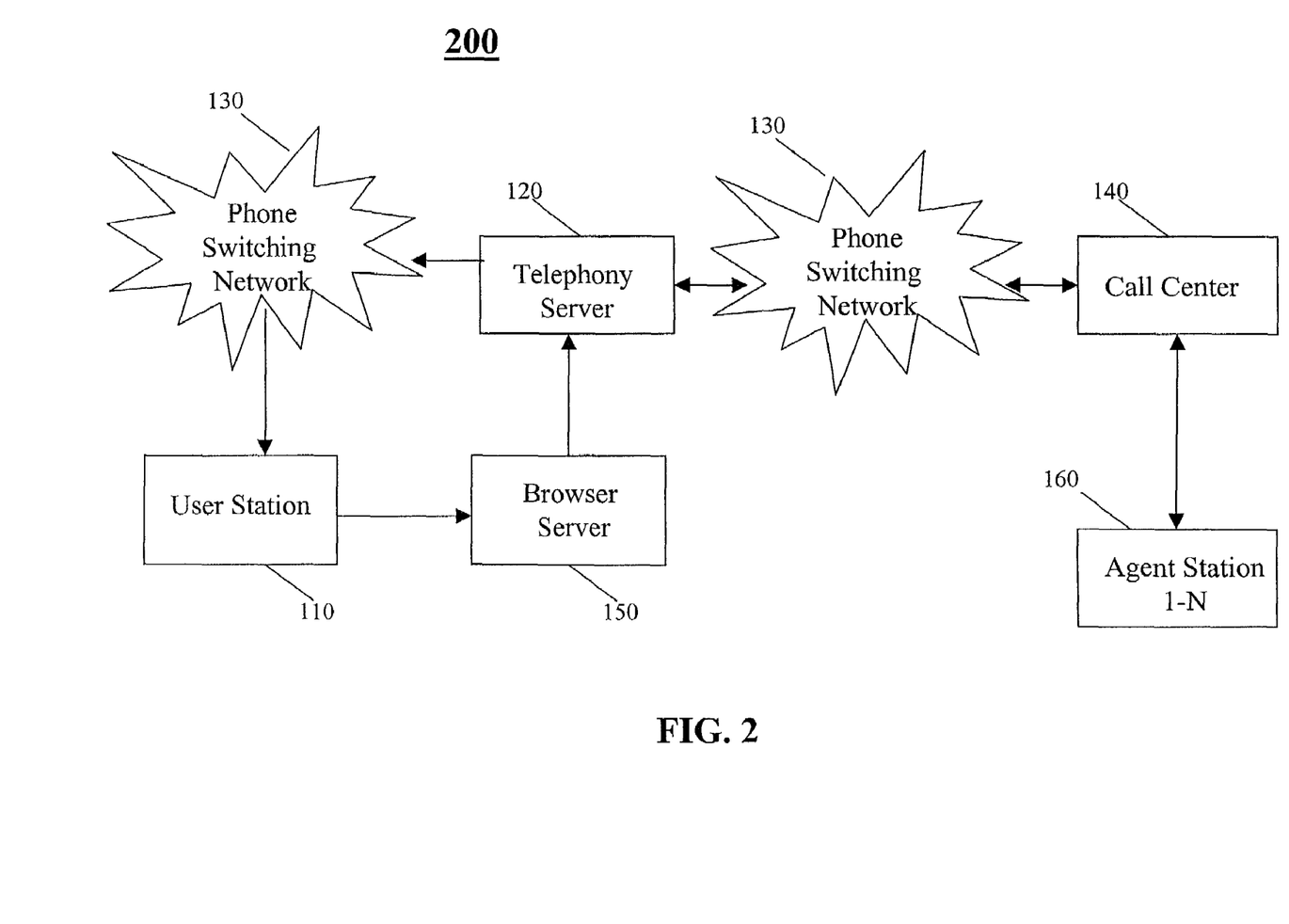
FIG. 2 is a high level block diagram of an exemplary embodiment of the invention, in which a call-back request for live customer support is enabled via automatically detecting when an agent is available.

FIG. 2 is a high level block diagram of an exemplary embodiment of the invention, in which an available agent is automatically detected when the agent answers a call, routed from a user's web request for a call-back to the agent through a call center. The system 200 depicted in FIG. 2 comprises the user station 110, the browser server 150, the Telephony server 120, the phone switching network 130, the call center 140, and the agent station 1 through N 160.

In system 200, a user at the user station 110 issues a call-back request via the browser server 150. The request is received by the Telephony server 120 and is forwarded, via the phone switching network 130, to the call center 140. The call center 140 then routes the call-back request to an appropriate agent at the agent station 160. When the agent answers the routed call, the agent enters an agent ID via Dual Touch-tone Multi Frequency (DTMF) tones which is routed, in a reverse direction, by the call center 140, through the phone switching network 130. The Telephony server 120 detects the DTMF tones and identifies the agent who is currently available to handle the call-back, requested by the user. The Telephony server 120 then bridges the call-back between the available agent at the agent station 160 and the user at the user station 110.

A user or a customer, at the user station 110, logs onto a web site, via the browser server 150, from where the customer may seek live customer support. To facilitate live customer support, the Telephony server 120 may implement a button on the web site so that the customer can request live customer support by simply clicking the button.

A request for live customer support may request a call back from an agent connected to the call center 140. The request may also request live customer support in a different form. For example, the customer may ask an agent to provide live customer support through a co-browsing session between the customer and the agent. The customer may also request to get live customer support through both a call-back as well as a co-browsing session with the agent. A co-browsing session may be helpful when the customer likes to show the agent some content listed on the web such as a bill containing a wrong charge. In this case, the customer may push a web page to the agent during the co-browsing session.

When live customer support is requested by the customer at the user station 110, relevant information necessary to facilitate the requested customer support may be specified by the customer. Such relevant information may include a call-back phone number (if a call-back is requested), a user ID representing the customer's login ID (if a co-browsing session is requested), the nature of the problem that needs customer support (so that an appropriate agent with proper skills can be selected), and the account number of the customer.

The request, issued via the web page together with the relevant information, is sent to the Telephony server 120 via the browser server 150. Upon receiving the call-back request, including the relevant information, the Telephony server 120, in response to the web request, initiates an appropriate phone call that encodes the relevant information necessary for the requested live customer support and places the phone call, via the phone switching network 130, to the call center 140.

The call center 140 selects an agent according to the information provided with the request. For example, if a customer has problems with billing and requests live customer support to solve the billing problem, the call center 140 may choose an agent who has the knowledge and skills related to billing problems. Once the agent is determined, the call center 140 routes the call-back request to the selected agent. The routing may include placing a call to the agent station corresponding to the agent and displaying the relevant information supplied with the call-back request by the customer who requested the call-back on a display screen of the agent.

When the selected agent answers the routed call 440, the agent enters an agent ID at the agent station 160. The entered agent ID is transmitted as DTMF tones through the call center 140 as well as the phone switching network 130. The Telephony server 120 detects, on the other end of the phone switching network 130, the DTMF tones. The Telephony server 120 decode the DTMF tones to extract the agent ID and identifies the agent, represented by the agent ID, as the available agent to handle the requested call-back.

Once the Telephony server 120 detects the available agent, it automatically places the call-back between the agent at the agent station 160 and the user who issued the request from the user station 110 and then bridges the entire session of the call-back.

Figure 3:
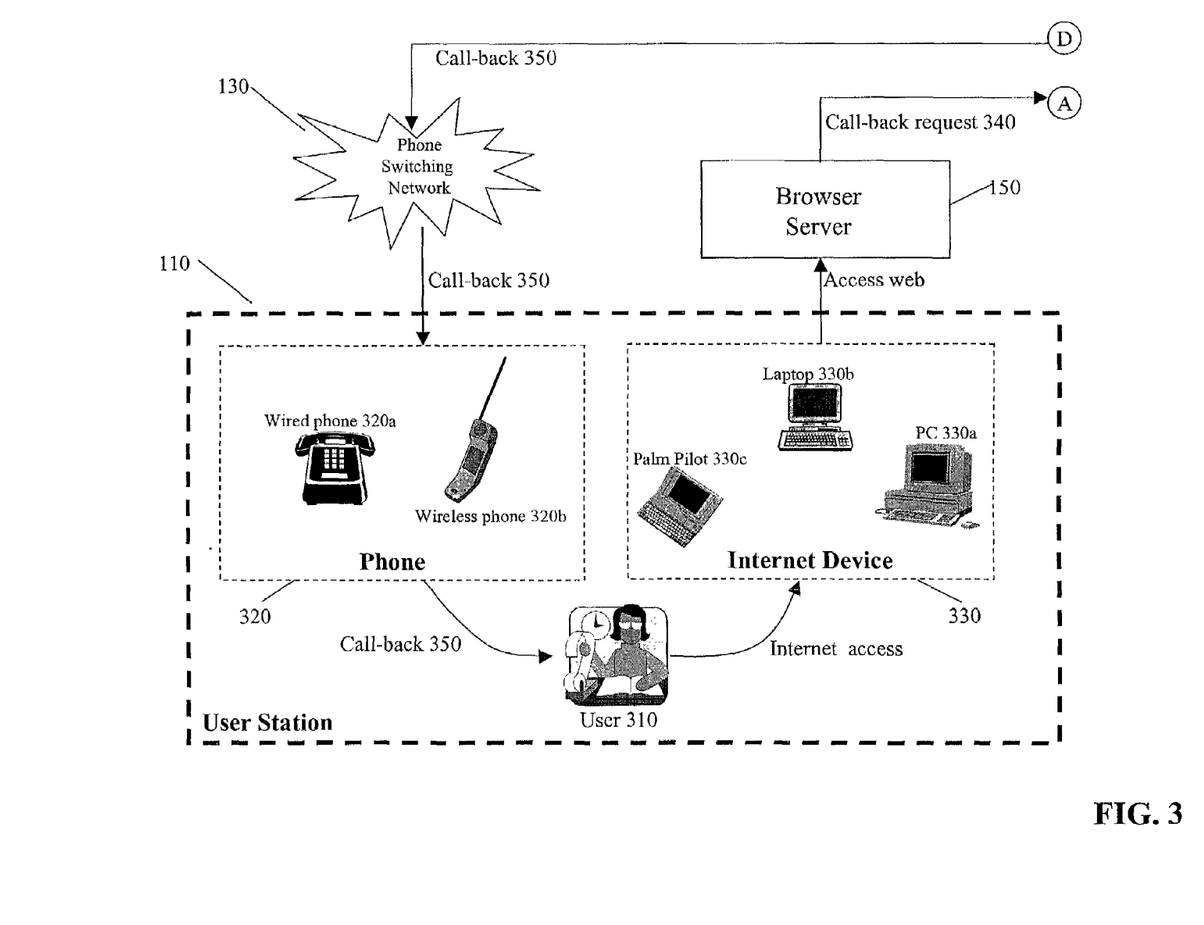
FIG. 3 is an exemplary configuration of a user station.

FIG. 3 is a schematic diagram of user station 110. The user station 110 includes a user 310, an Internet device 320, and a phone 330. Internet device 320 is a device that is capable of connecting to the Internet via a connection, in either wired or wireless fashion. Examples of such a device include a person computer 320a, a laptop 320b, or a Palm Pilot 320c. The user 310 may log onto the browser server via an Internet device 320.

The phone 330 may include a wired phone 330a or a wireless phone 330b. A wireless phone may be a cordless phone or a cellular phone. The user 310 may use the phone 330 to receive a call-back, routed via the phone switch network 130, for live customer support. The phone switching network 130 may be a conventional Public Switched Telephone Network (PSTN) or a wireless communication network.

When the user 310 chooses, via a web page, live customer support by clicking on a button on the web page corresponding to live customer support, the user 310 may be prompted to provide more relevant information, on the web page, that is necessary to complete the requested customer support. Such relevant information may include account number, nature of the problem that needs to be resolved through customer support, and the phone number for the requested call back. Once such information is collected, the user 310 may submit a call-back request 340, together with the provided relevant information, via the browser server 150. When the call-back request 340 is answered, a call-back 350 may be placed to the user 310 via the phone switching network 130.

Figure 4:
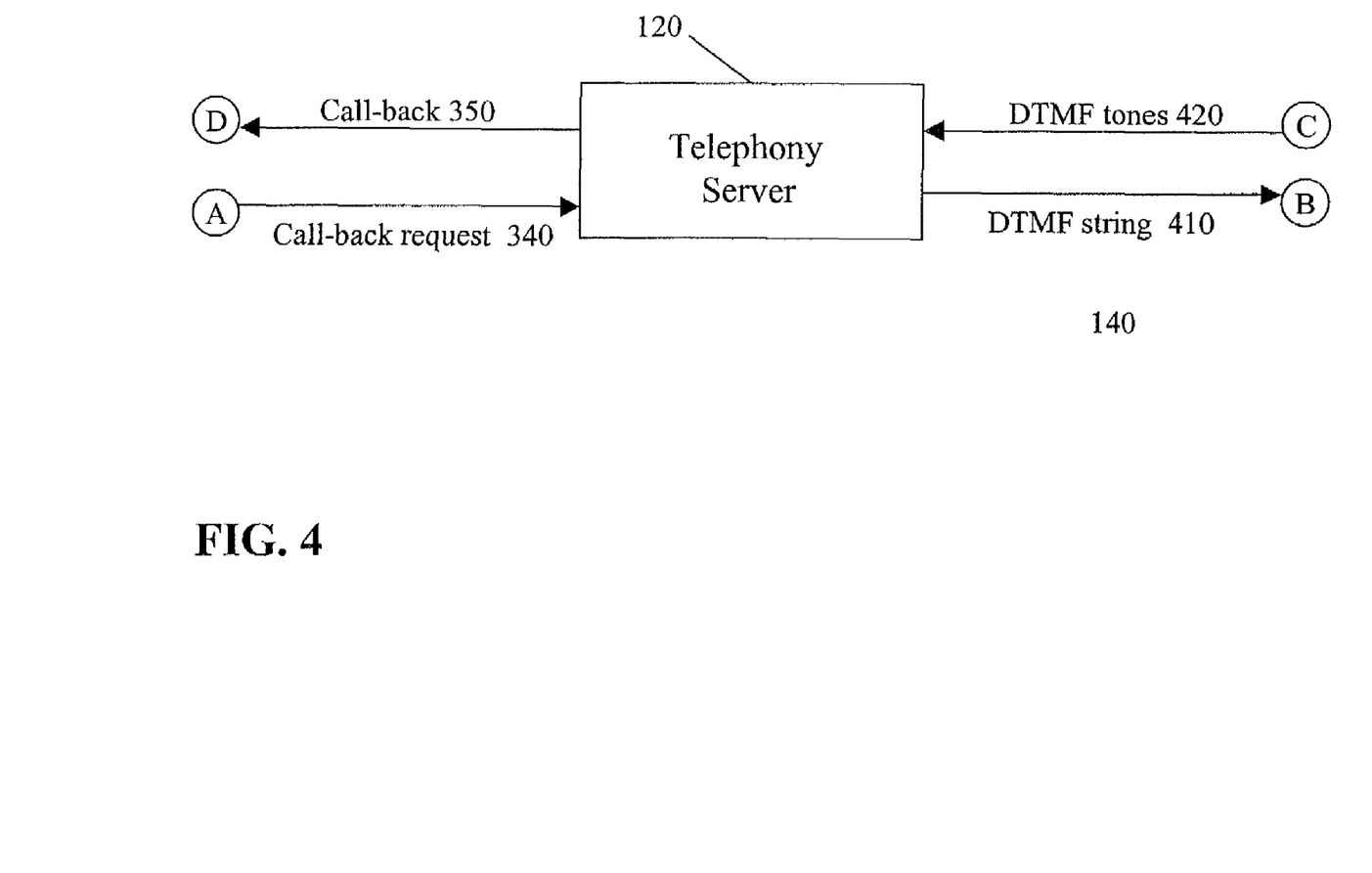
FIG. 4 illustrates the input and output of a telephony server 120.

FIG. 4 illustrates how information flows in and out of Telephony server 120. A call-back request 340 is sent to the Telephony server 120 from the browser server 150. To transmit such a request, together with relevant customer information, to the call center 140, the Telephony server 120 encodes the request and the relevant customer information into a DTMF string 410. The DTMF string 410 is then sent from the Telephony server to the call center 140, which subsequently routes the request to an agent.

When the agent answers the routed request, the corresponding agent ID is entered and sent, via the call center 140 and the phone switching network 130, in the form of DTMF tones 420. When the Telephony server 120 detects the DTMF tones 420, it decodes the DTMF tones to extract the agent ID. In this way, the Telephony server 120 identifies the available agent and automatically bridges the call-back 350 between the agent and the user 310.

Figure 5:
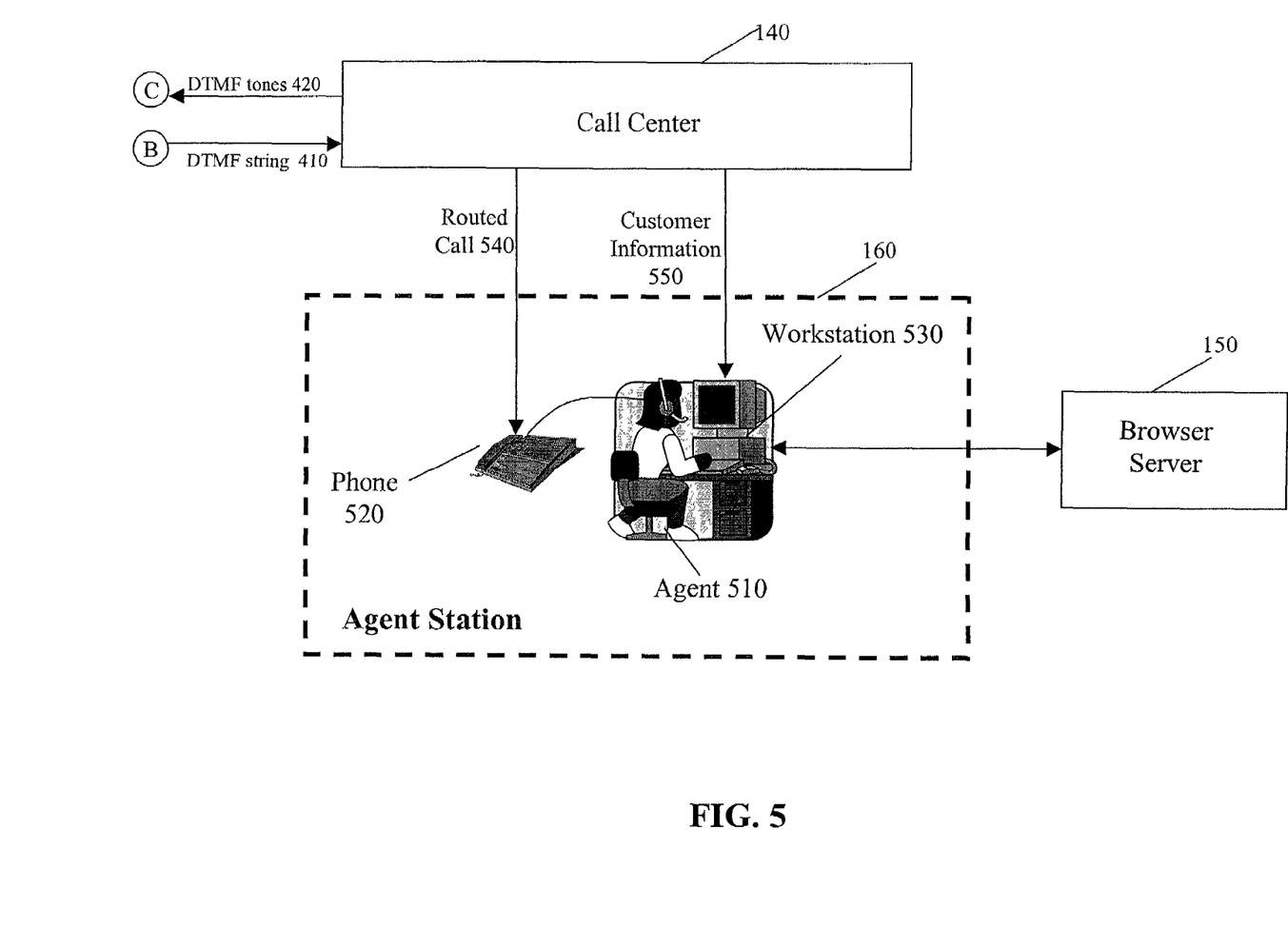
FIG. 5 is an exemplary configuration of an agent station.

FIG. 5 is an exemplary configuration of the agent station 160. Agent station 160 connects to the call center 140 and comprises an agent 510, a phone 520, and a workstation 530. The workstation 530 is capable of connecting to the Internet via either wired or wireless connection. Through the workstation 530, the agent 510 may be able to log onto a web site, through the browser server 150. The phone 520 in FIG. 5 may include a touch-tone phone connected to the call center 140.

A call-back request 340 for live customer support is routed to the agent station 160 in the form of a routed call 540 by the call center 140. The relevant customer information 550, supplied by the user 310 together with the call-back request 340, may be simultaneously sent to the workstation 530 at the agent station 160. When the routed call 540 reaches the phone 520, it rings. The customer information 550 related to the requested call-back (e.g., customer account) may also be displayed on the display screen of the workstation 530.

Figure 6:
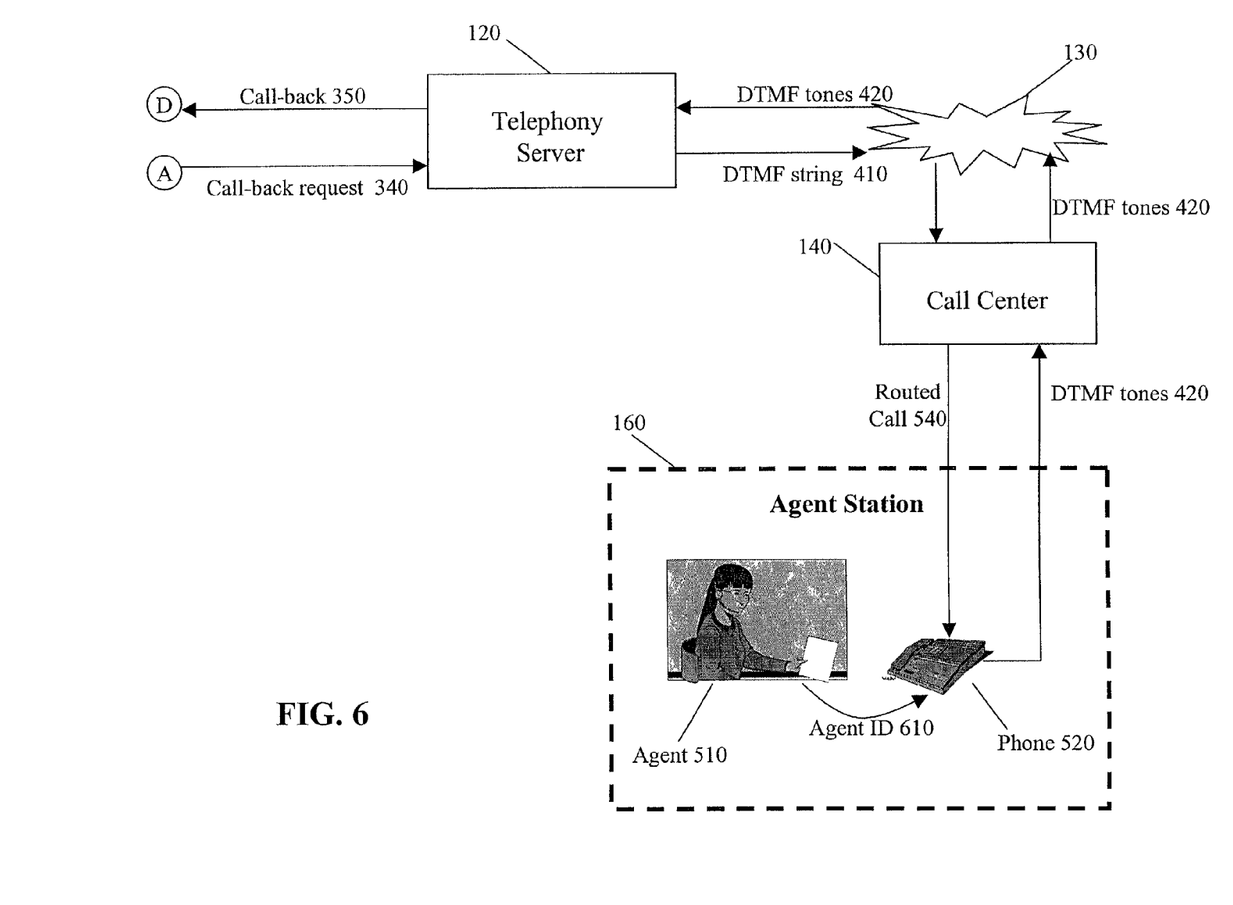
FIG. 6 is a more detailed diagram with data flow, in which a telephony server detects an available agent through DTMF tones.

FIG. 6 shows an exemplary process of detecting when an agent is available to execute a call-back to provide live customer support. The detection is triggered by a call-back request 340, issued at the user station 110 via the browser server 150. The request and the information relevant to the request (e.g., customer account and a call-back phone number) is sent to the Telephony server 120. Part of the relevant information may be retained at the Telephony server 120. For example, the Telephony server 120 may store the call-back phone number. Part of the customer related information may be encoded, together with the request, into a DTMF string 410 and transmitted to the call center 140. Based on the DTMF string 410, the call center 140 selects an agent at an agent station 160 to answer the request by forwarding the request as a routed call 540 to the agent station 160.

When the phone 520 rings due to a routed call 540, the agent 510 answers the phone. The agent 510 then enters the corresponding agent ID 610 on the phone 520. This generates DTMF tones 420, which encodes the agent ID. The call center 140 transmits the DTMF tones 420 through the phone switching network 130. The Telephony server 120 intercepts the transmitted DTMF tones 420 and decodes it to identify the agent who is available to handle the call-back request 340. The call-back 350 is then automatically placed between the available agent 510 and the user by the Telephony server 120.

Figure 7:
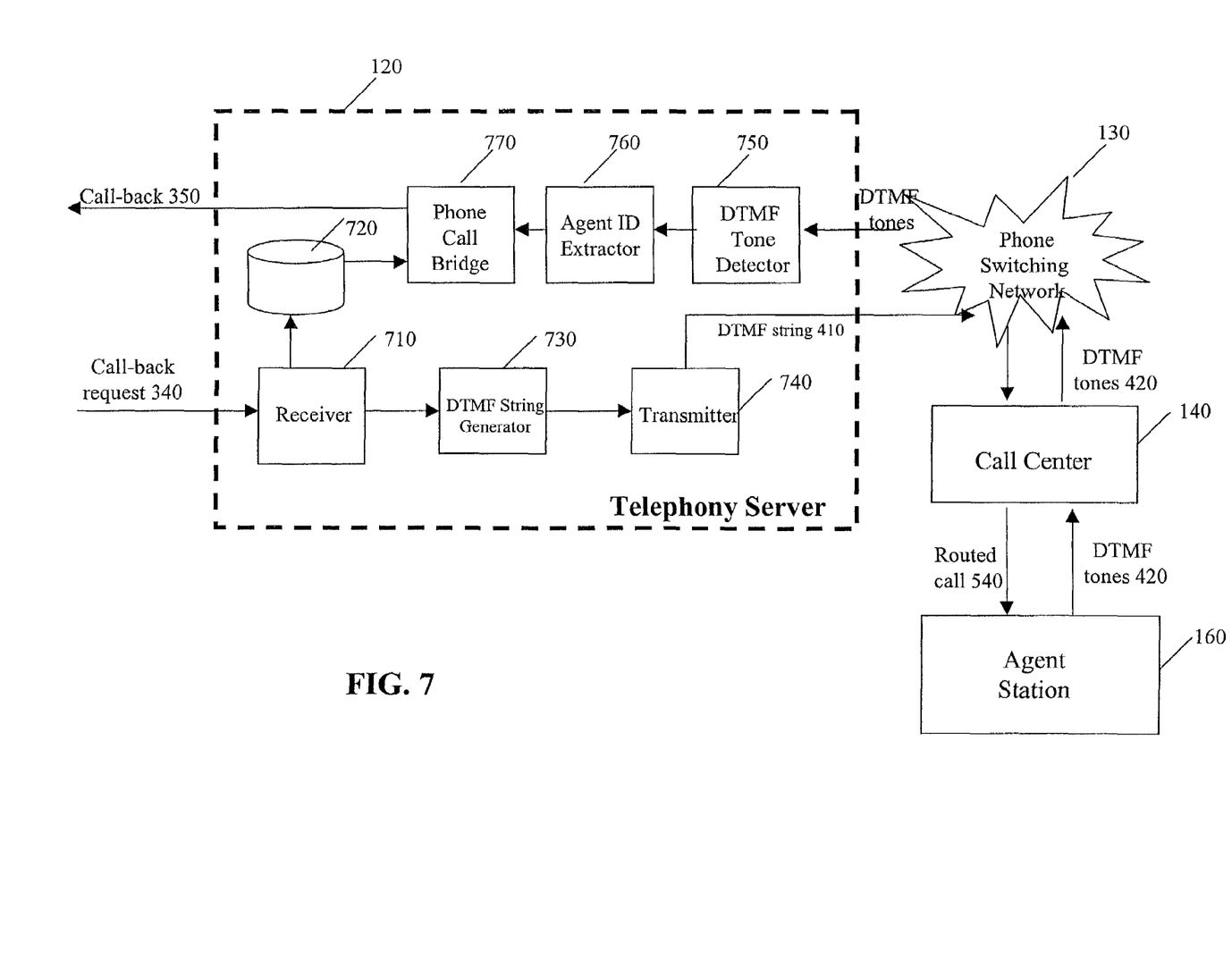
FIG. 7 is a more detailed block diagram of the Telephony server, which facilitates live customer support by both transmitting a call-back request and bridging the call-back between the detected available agent and the user who issues the call-back request.

FIG. 7 is an exemplary high level block diagram for the Telephony server 120, which initiates, in response to a web request for a call-back, a phone call to a call center and then automatically bridges the call-back by detecting an available agent via DTMF tones. The Telephony server 120 includes a receiver 710, a storage 720, a DTMF string generator 730, a transmitter 740, a DTMF tone detector 750, an agent ID extractor 760, and a phone call bridge 770.

The receiver 710 connects to the browser server 150 (FIG. 2) and receives a call-back request issued by a user 310 via a web page. The information received by the receiver 710 may comprise information relevant to the request, including customer account information and a call-back phone number. Some of the received information may be retained and stored locally in the Telephony server 120. For example, the call-back phone number may be stored in storage 720 so that when the Telephony server detects next available agent, it can retrieve the stored call-back phone number and automatically make a call-back based on the retrieved phone number.

The receiver 710 parses the call-back request and its relevant information and then sends the parsed information to the DTMF string generator 720. The DTMF string generator 720 encodes the information that is useful for an agent to complete the requested call-back (e.g., customer account information) into a DTMF string 410. Encoding the web information into a DTMF string enables the Telephony server 120 to convert a web request into a phone call. By doing so, an existing call center that does not have the capability of directly accepting web requests can handle the customers' requests for live customer service, issued from a web page, in a similar fashion as it handles customers' request for live customer service via conventional phone calls.

The generated DTMF string 410 is transmitted, by the transmitter 740, to the call center 140, via the phone switching network 130. The Telephony server 120 then waits for DTMF tones 420, as a reply to the DTMF string 410. The call center 140 places a routed call 540 to a selected agent at the agent station 160. When the selected agent answers the routed call 540 with an agent ID entered via, for example, a touch-tone phone, DTMF tones 420 are generated, that encodes the agent ID. The call center 140 sends out the DTMF tones 420, which is then intercepted by the DTMF tone detector 750 of the Telephony server 120.

The agent ID extractor 760 decodes the DTMF tones 420 and extracts the agent ID encoded in the DTMF tones 420 Such an agent ID is used as the identification of the agent who answers the routed call 540 and who is available to handle the call-back request. The Telephony server 120 retrieves the information related to the call-back request, such as the corresponding call-back phone number stored in the storage 720, places the call-back 350 using the retrieved call-back phone number, and bridges the entire phone call session between the user 310 and the available agent at the agent station 160.

Figure 8:
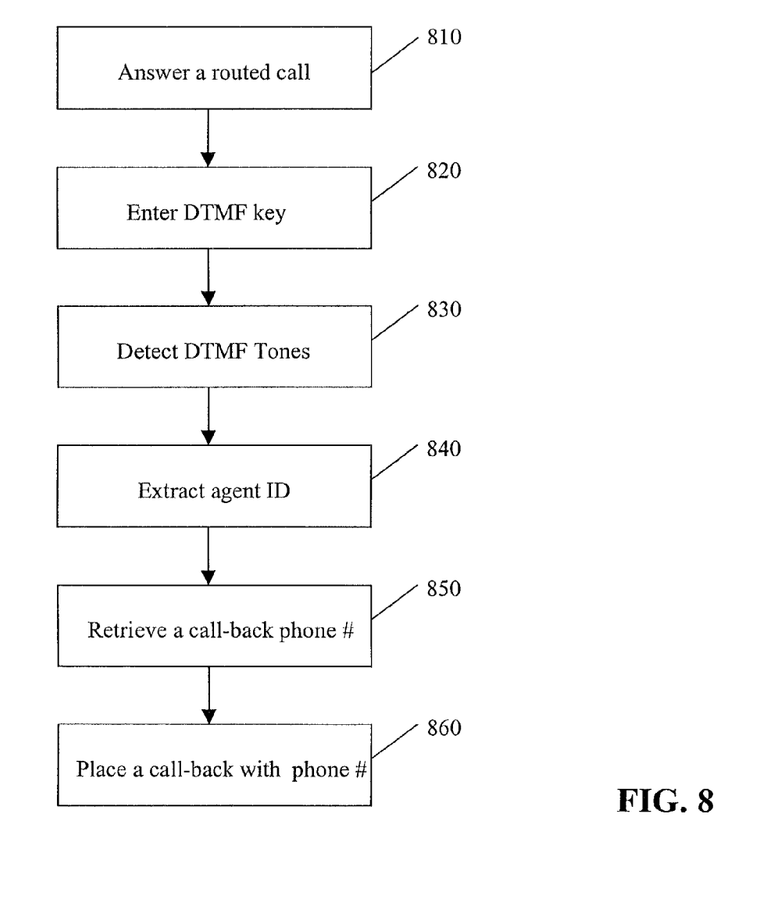
FIG. 8 is an exemplary flowchart for the process of connecting a detected available agent with a user.

FIG. 8 is an exemplary flowchart for the process of detecting an available agent to handle a call-back request and to connect the detected available agent with the user who requested the call-back. An agent 510 answers a routed call 540 at act 810. The routed call 540 is initiated by the call center 140 based on a call-back request 340 issued by a user 310 via a web page. The routed call 540 is directed to the agent 510 according to the required skills specified, for example, in the request 340. At act 820, the agent 510 enters, on the phone 520 associated with the agent station 160, the corresponding agent ID 610 which is encoded into DTMF tones 420.

The Telephony server 120 detects, at act 830, the DTMF tones and decodes it to extract, at act 840, the agent ID 610. The extracted agent ID identifies the agent who answers the routed call 540. The Telephony server 120 retrieves the call-back phone number, at act 850, from the storage 720. At act 860, based on the retrieved call-back phone number, the Telephony server 120 connects the available agent 510 with the user who issues the call-back request by placing and bridging the call-back from the agent 510 to the user 310.

The processing described above may be performed by a general-purpose computer alone or in connection with a special purpose computer. Such processing may be performed by a single platform or by a distributed processing platform. In addition, such processing and functionality can be implemented in the form of special purpose hardware or in the form of software being run by a general-purpose computer. Any data handled in such processing or created as a result of such processing can be stored in any memory as is conventional in the art. By way of example, such data may be stored in a temporary memory, such as in the RAM of a given computer system or subsystem. In addition, or in the alternative, such data may be stored in longer-term storage devices, for example, magnetic disks, rewritable optical disks, and so on. For purposes of the disclosure herein, a computer-readable media may comprise any form of data storage mechanism, including such existing memory technologies as well as hardware or circuit representations of such structures and of such data.

In the preferred embodiment, the telephone information service is a customer support center. However, this invention is not limited to customer support, but equally applicable to telephone services used for sales, pre-sales, information distribution and polling. While in the preferred embodiment, users of the system are customers, this invention equally applies to users who are employees, vendors, clients or potential future customers. The preferred embodiment also uses a web browser for the agent and customer, but the invention equally applies to other networked client applications.

While the invention has been described with reference to the certain illustrated embodiments, the words that have been used herein are words of description, rather than words of limitation. Changes may be made, within the purview of the appended claims, without departing from the scope and spirit of the invention in its aspects. Although the invention has been described herein with reference to particular structures, acts, and materials, the invention is not to be limited to the particulars disclosed, but rather extends to all equivalent structures, acts, and, materials, such as are within the scope of the appended claims.

What is claimed is:

1. A method for automatically detecting when an agent is available, comprising:

connecting a telephony server between a user station and a call center not having call back capabilities via a telephone switching network, the call center in communication with at least one agent station;

connecting a browser server to the telephony server and the user station and the agent station;

the telephony server receiving a request from the user station via the browser server for a call-back from an agent;

the telephony server configured to encode information received from the web server into a dual tone multi frequency (DTMF) string, the telephony server also calling the call center using said DTMF string;

the call center connecting the call to the agent station;

entering an agent ID, by an agent at an agent station when the agent answers the call from the telephony server, the agent ID entered yielding DTMF tones encoding the agent ID corresponding to the agent;

detecting, by a telephony server, the DTMF tones resulted from the agent ID entered by the agent to detect that the agent is available; and the telephony server calling back the user station and bridging a call back between the user station and the available agent.

2. The method according to claim 1, wherein the request for call back comprises:

a telephone number, to be used for the call-back and a problem; and matching the available agent to the problem.

3. A system, comprising:

a call center to connect an incoming call to an agent telephone, the call center being without call-back capabilities;

a telephony server comprising:

receiver for receiving a request for a call-back from a user over the internet;

a dual tone multi frequency (DTMF) generator for encoding user information received over the internet into DTMF commands understood by the call center;

a transmitter to call the call center over a telephone network providing the DTMF commands;

a DTMF detector for receiving a DTMF string entered by an agent answering the agent telephone to identify that the agent is available; and a bridge for calling back the user to connect the available agent to the user.

4. The system as recited in claim 3, wherein the user information comprises an account number.

5. The system as recited in claim 3, wherein the telephony server further comprises:

storage for storing a call-back phone number and a user problem, wherein the available agent is matched to the user problem.

* * * * *